Patented Nov. 5, 1929

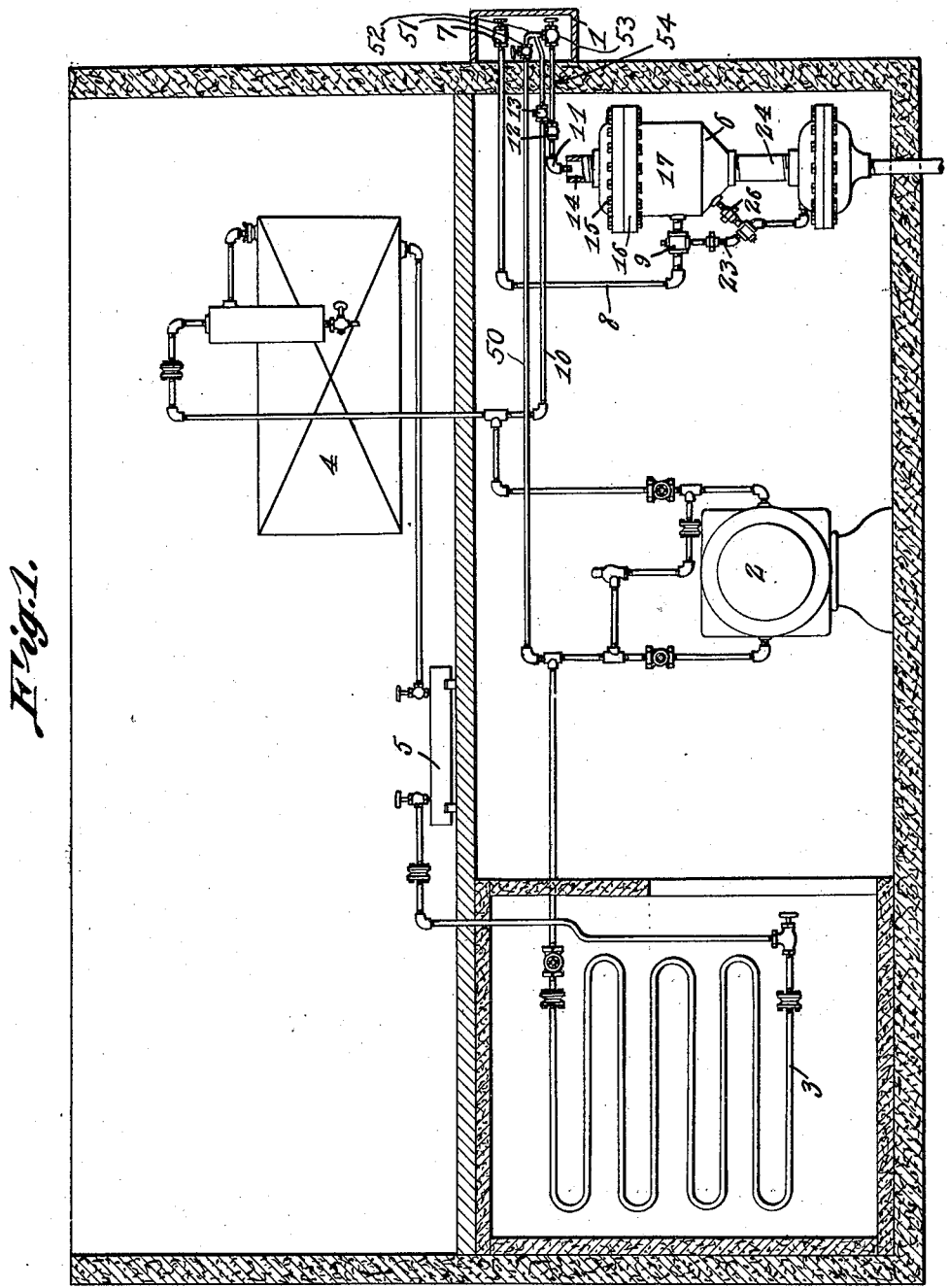

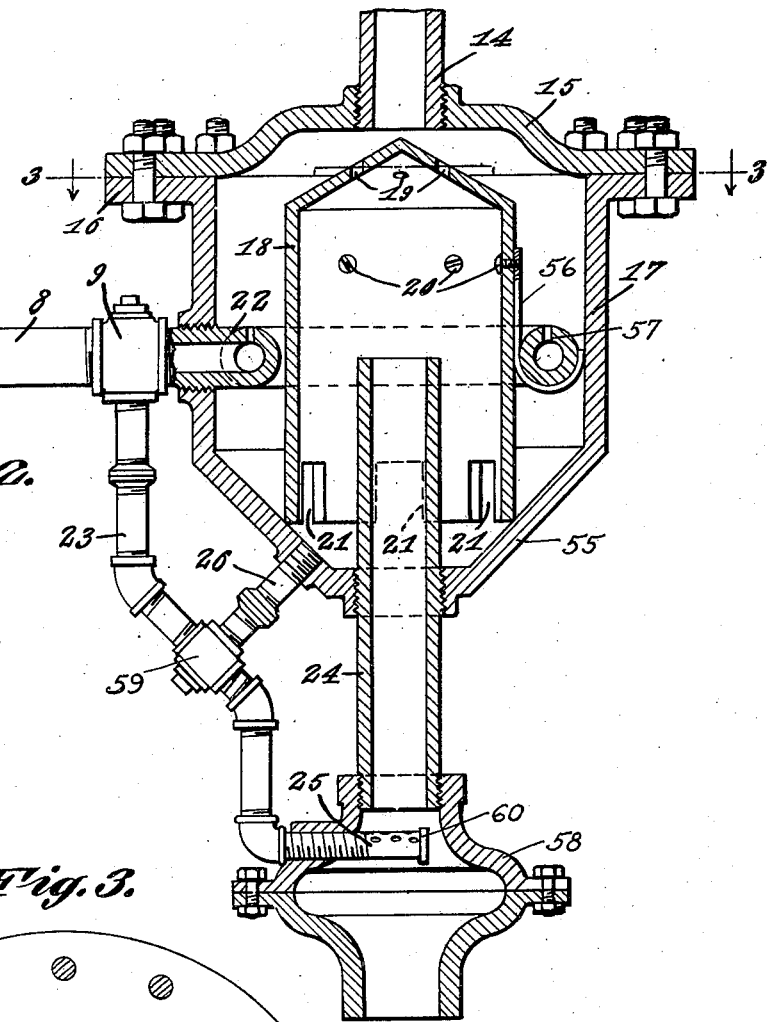
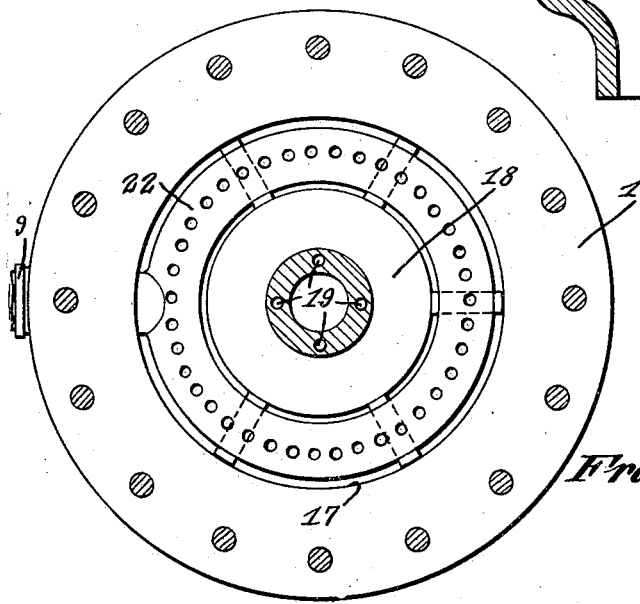

1,734,862

UNITED STATES PATENT OFFICE

FRANK D. KOERKLE, OF LANCASTER, PENNSYLVANIA

MIXER

Application filed August 24, 1927. Serial No. 215,253.

This invention relates to protection against dangerous conditions arising from refrigerating plants when the pipes carrying anhydrous ammonia burst or spring a leak. Breathing of strong ammonia is fatal and it is usual to provide refrigerating plants with means for carrying away the escaping ammonia and discharging it at a harmless place, as a sewer. Devices intended to accomplish this result are commonly provided with means for tapping a water main at a point outside the refrigerating plant and simultaneously bringing into relation to the stream of water a discharge pipe from one of the ammonia mains. My invention relates to an improved mixer for absorbing the ammonia by water and for harmlessly disposing of it by leading it to a safety point, such as a sewer. The mixer I prefer for this purpose is a strong cast iron casing with a bolted cap plate within which is mounted an annular spray pipe for throwing a vertical stream of water, and within the annular spray pipe is a perforated bell communicating with a pipe at the top of the cap by which the ammonia may be led from one of the mains from the outside of the building and brought into mixing relation to the water. The bottom of the bell surrounds a discharge pipe leading to a sewer and said bottom is vertically channeled around its periphery so as to permit discharge of water into the bell and around the discharge pipe. Connected with the casing also is a branch pipe connecting with a shunt path of the water to the annular pipe in the casing and this shunt path leads by a pipe to an auxiliary chamber at the bottom of the waste pipe leading to the sewer, thereby providing a plurality of vertical jets of water to further absorb and dilute the partially saturated water discharge around the bell. A mixer of this type has proven of great value in emergencies where serious leaks of ammonia have occurred in refrigerating plants and is a far more efficient type of construction than mixers commonly provided for disposing of the fumes.

My invention therefore consists of a mixer for disposing of ammonia fumes, having water connection and an ammonia switch from an ammonia main in the plant accessible from the outside of the plant, and a bell in the nature of a strainer within the mixer surrounded by an annular water jet pipe and a discharge pipe to the sewer within the bell to thoroughly effect mixing of the water and gas and discharge it from the plant. A further and important object of the invention is the provision of means, in the nature of valves, arranged on the outer wall of a refrigerating plant that are accessible to a fire official or others notified of or discovering dangerous conditions in the plant so that the said valves may be opened for directing the strong ammonia out of the plant into a sewer or the like and in which one of said valves may be of the Siamese type to permit of the same being coupled to a water hose from the fire engine, or may be otherwise connected to a water supply under forced pressure, with the result that persons, firemen or others may safely enter the building after the mixer has been brought into operation without being overcome by the ammonia fumes.

It embodies also other more specific features, the novelty of which will be more fully hereinafter described and will be definitely indicated in the appended claims.

In the drawings accompanying this specification:

Figure 1 illustrates in a typical way a refrigerating plant based on the absorption system of ammonia refrigeration, containing in outline a mixer according to my invention and showing a control box at a safety point without the building for use in emergencies.

Figure 2 represents a sectional view of a mixer embodying my invention.

Figure 3 is a section on the plane 3—3 of Figure 2 looking downward.

Referring now in detail to the drawings, 1 represents a casing outside of a refrigerating plant, containing valves for controlling ammonia and water pipes. 2 represents a compressor commonly used in refrigerating plants to compress and recompress the ammonia after repeated expansions and distribute it through a series of pipes in the plant to refrigerating rooms containing expansion coils, as at 3. 4 represents a condenser and 5 a receiver forming part of the ammonia distribution system. In a suitable part of the building adjacent to the control box 1 is placed my mixer 6 to control connection with a water main by the valve 7 or which may have attached thereto a hose line from a fire engine in case a serious escape of ammonia occurs within the plant. The box or like casing 1 has an opening which is normally closed by a door, (not shown) the said door being locked so that the same can be opened only by members of a fire department or by other authorized persons. The suction pipe of the system in the refrigerating plant is indicated for distinction by the numeral 50, the same having a branch in the box or casing 1 which has a branch connection with the discharge pipe 10 of the system. There is ordinarily always a circulation between the pipes 50 and 10, but in the box and connected with the pipe 50 there is a hand operated valve 51. Also in the pipe 10 there is a valve 13 which is in the nature of a check valve and prevents the back pressure of a fluid therethrough. For distinction the branch that connects the pipes 50 and 10 in the box 1 is indicated by the numeral 52 and this branch is connected with the casing of a hand operated valve 53, the said valve casing having screwed therein an ammonia flow pipe 54 that has at its outer end a downwardly directed nozzle 11. The pipe 54 has screwed therein a check valve 12 to prevent the passage of fluid in the direction of the valve 53.

In the box-like casing 1 there is another valve 7. This valve is preferably of the Siamese type, so that one branch thereof may have screwed therein the end of a water conducting hose for a fire engine or the said valve may have its angle branch connected directly to a source of water under pressure. To this valve there is connected a water conducting pipe 8, which is designed for delivering water under pressure into the mixer 6.

It will be noted and as previously stated, that all of the valves in the box 1 are hand operated and designed to be opened or closed by persons or firemen exteriorly of the plant. The outer or body portion 17 of the mixer is of cylindrical formation and the bottom thereof is flared downwardly and inwardly, as at 55. The top of the body 17 is formed with a continuous outwardly directed flange 16 on which rests and to which is bolted the top member or cap 15. The cap has its central portion bulged outwardly and the cap at the center thereof has screwed through an opening therein a short pipe 14 into which the nozzle 11 projects.

Resting on and if desired, fixed to the flared bottom 55 of the body or chamber 17, there is the open bottom of a bell that provides a strainer 18. The top of the bell is in the form of a conical dome whose apex is arranged centrally with respect to the longitudinal plane of the bore of the short pipe 14 and this dome below its apex is formed with an annular series of apertures 19. The open bottom of the strainer is notched, as at 21, and the said bottom is arranged above the bottom of the mixing chamber 17, but as stated, is in contact with the walls of the flared portion 55 of the said bottom.

There is screwed or bolted on the outer wall of the bell-like strainer 18 straps 56 which have their lower ends rounded to provide supports for an annular pipe 22 that has a branch screwed through the chamber 17 and screwed into the casing of a stop cock 9 into which the end of the pipe 8 is also screwed. The stop cock is normally open. The annular pipe 22 has its upper face provided with a series of equidistantly spaced apertures 57, which, of course, communicate with its bore and which, when water is let into the said pipe 22 causes the same to be ejected through the apertures in an upward spray. The pipe 22 is in the nature of a water distributor and is designed to spray water over the outer wall of the strainer 18, the inner wall of the chamber 17, and against the concaved bottom of the cap 15, provided by the bulged portion therein, the stream of water being also directed over the conical top of the strainer chamber 18. It will thus be noted that the water thrown from the distributor pipe 22 is ejected in multiple jets of water sprays which, after first being directed along the sides of the casing of the bell will gravitate into the flared bottom of the casing 17, such water passing through the notches 21 in the strainer or bell 18.

Screwed in the bottom of the chamber 17, and projecting a suitable distance above the notched bottom 21 of the strainer 18, there is a water outlet pipe 24, and the outer end of this pipe is screwed into one of the reduced ends of a centrally bulged two-part casting that provides what I will term an auxiliary or after mixer and which is indicated in the drawings by the numeral 58.

Screwed in the bottom of the casing of the stop cock 9 there is a downwardly directed comparatively small pipe 23 which has a central angle portion disposed in a plane with the flared bottom 55 of the casing or chamber 17. This pipe provides a shunt path for the water, and the sections comprising the pipe are, of course, connected by suitable couplings. The central and angle portion of the shunt path has its pipe sections connected to a stop cock 59 whose core is normally open and screwed in its casing and in the flared bottom 55 of the chamber 17 there is a bypass pipe 26. The lower end of the shunt path has coupled thereon a spray pipe 25 which is screwed through a suitable opening in the auxiliary or after mixer 58. The outer end of this spray pipe 25 is closed but the same at the top and sides thereof is provided with series of apertures 60 which, of course, communicate with the bore of the pipe 25 and which are arranged in a line with the bore of the outlet pipe 24.

The auxiliary or after mixer 58 is piped to a sewer.

In the event of dangerous conditions arising in the refrigerating plant, when the anhydrous ammonia pipes burst or spring a leak an alarm may be given to the nearest engine station or the attendants in the plant may find time to escape and to open a door in the box or casing 1. The operator will first shut off the valve 51 and turn on the valve 53, so that the ammonia, instead of following its usual course, will pass through the nozzle 11 into the pipe at the top of the mixer 6. Directly after or simultaneously with this operation the valve 7 for the water conducting pipe is turned on. Water under pressure will pass through the pipe 8 and entering the sprinkler pipe 22 will be ejected in sprays through the apertures 57 therein. At the same time water will be directed through the bypass 23, the pipe 26 and the spray pipe 25. The strong affinity of water for ammonia, of which it absorbs hundreds of times its volume at atmospheric pressure, takes up the ammonia with avidity and the ammonia which is thoroughly mixed with the water must pass either through the apertured top 19 of the mixer or bell, when the same is subjected to the pressure of water from the pipe 26 or through the thoroughly water immersed chamber 17 before it can find an outlet through the pipe 24. The water containing ammonia is subjected to an additional spray from the pipe 25 which is arranged in the auxiliary or after mixing chamber 58 before the same finds an outlet to the sewer. The gas mixture is thus thoroughly exposed to the jets of water and by the agitation of the same new surfaces are constantly exposed so as to permit saturation.

The construction, operation and life saving advantages of my improvement will, it is thought, be understood and appreciated by those skilled in the art to which such invention relates after the foregoing description has been carefully read in connection with the accompanying drawings, it being understood that I reserve the right to make such changes therefrom as fairly fall within the scope of what I claim.

Having thus described my invention, what I claim as new and desire to secure by Letters Patent is:

1. In a refrigerating system safety device of the character described, a mixer comprising a body portion, a detachable top for said body portion, a short pipe secured in said top and rising therefrom, a nozzle pipe in communication with an ammonia pipe of the system and having its nozzle arranged in the short pipe, a bell arranged in said body portion and having a notched lower edge supported on the bottom of said body portion, an apertured top for said bell, a pipe extending through the bottom of said body portion and terminating at its upper end in said bell, spraying means surrounding said bell and secured thereto, an auxiliary mixer having connection with the lower end of said last mentioned pipe, spraying means in said auxiliary mixer, means for introducing water to the respective spraying means and means of communication between the water introducing means and the bottom of said body portion and being arranged to introduce water in said bell.

2. In a refrigerating system safety device of the character described, a mixer comprising a body portion having a flared bottom, a pipe threaded through said bottom, a bell of cylindrical form arranged in said body and having a notched bottom supported on the flared bottom, a conical top for said bell and being apertured, a detachable top for said body portion, a short pipe rising from the detachable top and disposed above the apex of the conical top, said short pipe being adapted to receive a nozzle disposed in communication with an ammonia pipe of the system, an auxiliary mixer secured to the first mentioned pipe, spraying means in the body portion, spraying means in the auxiliary mixer, means for supplying water to the respective spraying means, and means in communication with the water supplying means for supplying water in the body portion and being disposed below the open bottom of the bell whereby water will flow in the latter.

3. In a refrigerating system safety device of the character described, a mixer including a body portion, a bell arranged in said body portion and resting upon the bottom thereof, said bell having an open bottom and a closed apertured top, a top for said body portion, an inlet pipe rising from the last mentioned top and disposed above the apex of the top of the bell, an outlet pipe disposed in said bell and passing through the bottom of the body portion, an auxiliary mixer in communication with the lower end of the outlet pipe, and means for introducing water in the body portion, in the bell and in the auxiliary mixer.

In testimony whereof I affix my signature.

FRANK D. KOERKLE.